April 9, 1957  J. W. GRAY  2,788,478
LIMIT STOP CONTROL CIRCUIT FOR SYNCRO SYSTEM
Filed Jan. 25, 1955

INVENTOR.
JOHN W. GRAY
BY
ATTORNEY

United States Patent Office 2,788,478
Patented Apr. 9, 1957

2,788,478

LIMIT STOP CONTROL CIRCUIT FOR SYNCRO SYSTEM

John W. Gray, Pleasantville, N. Y., assignor to General Precision Laboratory Incorporated, a corporation of New York Application January 25, 1955, Serial No. 484,023

10 Claims. (Cl. 318—30)

This invention relates to electrical servomechanisms having electrical stops to limit their mechanical motion, and more particularly to such devices associated with rotary inductor signal transmitters.

A rotary inductor or synchro system for transmitting indications of angle to a distant point may be made to give either mechanical or electrical output indications. When the output is electrical in form and when the power must be greater than can be furnished by a control transformer or when direct current indication is required, it is conventional to employ a voltage varying device, such as a potentiometer, positioned by the servomechanism output shaft, to produce an electrical output proportional to the output shaft displacement. Single turn potentiometers are usually provided with mechanical stops to limit their movements to less than 360° and multiturn potentiometers must necessarily have stops. However, when such a potentiometer is used and the synchro input signal represents an angle continuously changing in one direction, the potentiometer is soon brought against a limit stop and immobilized. If it be required that the output indicator shall indicate all angles within its active circumferential range during each revolution of the input signal, rather than remain immobile against a stop, a circuit such as that provided by the present invention is necessary.

The present invention provides an electrical switch to control the direction of servo operation, and a coincidence or comparison circuit to compare input and output phase senses. The circuit of the invention thus causes the mechanical or electrical output to take a repeated sawtooth form when the input constitutes a signal continuously progressing in one direction, so that during limited portions of the input signal the output magnitude is directly proportional to the input magnitude.

One object of the invention is to provide a synchro system having a servomechanism output shaft with limited range of motion, with means for keeping the output shaft at an angle representing any input shaft angle within the limited range of motion.

Another object of the invention is to provide an arrangement for preventing immobilization of a synchro servo system operating between limit stops.

A further understanding of this invention may be secured from the detailed description and drawings, in which.

Figures 1, 2:
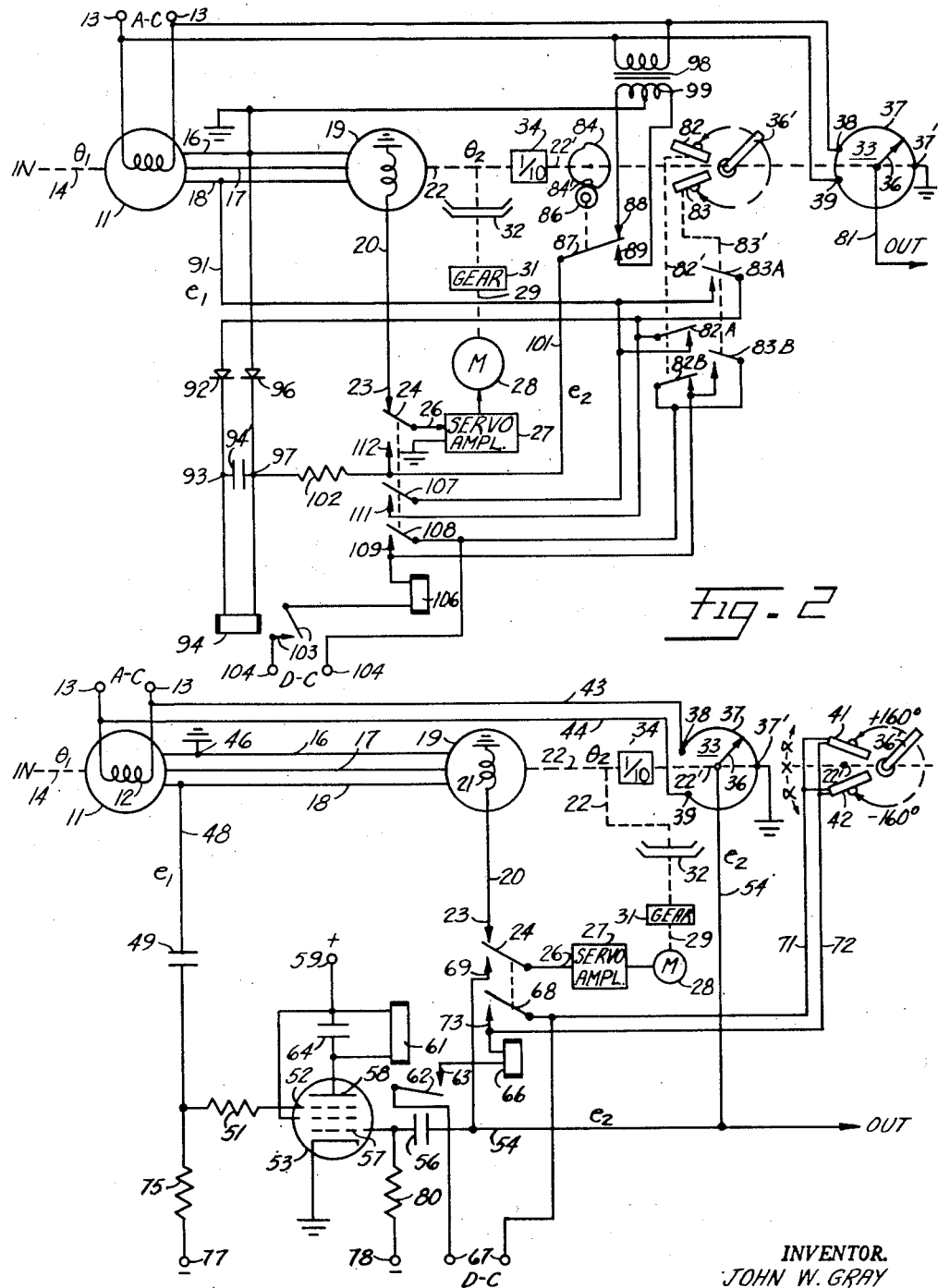
Figure 1 is a schematic diagram of one embodiment of the invention.
Figure 2 is a schematic diagram of a modified embodiment of the invention which does not require the use of electronic tubes.

Referring now to Fig. 1, a synchro transmitter 11 has a rotating field winding 12 which is energized from alternating current supply terminals 13. For the purposes of description the synchro transmitter 11 is considered to have three-phase stationary armature windings, but the present invention can as well employ a two-phase or other multiphase synchro system. The signal input shaft 14 is positioned to an angular magnitude $\theta_1$ which constitutes the input signal, and which is represented by the relative amplitudes or space phases of the alternating potentials induced between pairs of the three output signal conductors 16, 17 and 18.

A second synchro instrument 19 is similar to the synchro transmitter 11 but is employed as a control transformer. The multiphase windings of synchro 19 are energized from conductors 16, 17 and 18, and the output derived from its rotor winding 21 constitutes an error voltage representative of the cosine of the difference between the angular position $\theta_2$ of output shaft 22 and $\theta_1$. For example, assuming the multiphase windings of synchros 11 and 19 are similarly oriented, when the rotor windings 12 and 21 and their connected shafts 14 and 22 are 90° apart in angular position the error voltage at the terminals of rotor winding 21 is zero. When the two windings 12 and 21 are similarly oriented, so that the input and output angular displacements are the same, the potential induced in winding 21 is maximum.

One terminal of winding 21 is grounded and the other terminal is connected through conductor 20, relay contact 23, relay contact arm 24 and conductor 26 to the input of a servo amplifier 27. The amplifier 27 is connected to operate a motor 28 having its shaft 29 connected through a speed reduction gear 31 and a slip clutch 32 to turn synchro shaft 22. This feedback connection from winding 21 to shaft 22 is in negative sense, so that rotation of shaft 22 by motor 28 tends to reduce the error output signal of winding 21 and the whole constitutes a position servomechanism.

As so far described the synchro system is conventional except for slip clutch 32, and produces an output shaft displacement angle $\theta_2$ representative of input shaft displacement angle $\theta_1$ without ambiguity within 360°. When, therefore, the input angle $\theta_1$, is kept within 360° the output angle $\theta_2$ of the servo shaft 22 closely follows it.

The angular position of shaft 22 may be indicated electrically within limits by a transducer such as a potentiometer 33 driven by the shaft 22 and having a voltage output. Potentiometer 33 may be either linear or tapered, and is of the 10-turn type. It is driven through a speed step-up gear 34 so that a single revolution of shaft 22 of 360°, or a little less, is represented by 10 revolutions of the potentiometer 33. The entire resistance wire traversed in 10 revolutions of the potentiometer slider arm 36 is represented for convenience in the figure by the arc 37, and the arc terminals 38 and 39 represent the two electrical end terminals of the 10-turn resistance element. The midpoint 37' of the resistance wire is grounded and the corresponding angle attained by shaft 22 is defined as the zero angle of shaft angular position. The mechanical end terminals or limit stops of the 10-turn resistance wire are represented by the blocks 41 and 42, and the slider arm as mechanically cooperating with these stops is represented by the arm 36' rotated by shaft 22'. The two equal stop angles $\alpha$ represent the angular distances from the horizontal position at which the shaft 22 is stopped by the potentiometer limit stops. As an example, $\alpha$ may be 20°, so that when arm 36' is at the limit stop 41 the angular position of shaft 22 is +160°, and when arm 36' is at stop 42 the shaft angle is −160°.

The potentiometer 33 is energized by alternating current, connections being made from its terminals 38 and 39 through conductors 43 and 44 to the alternating current supply terminals 13 which supply field 12. A linear potentiometer is selected for use in this example, so that the variation of slider output potential to ground with $\theta_2$ is linear to the extent that the potentiometer is linear, and passes through zero at its midpoint. The relative phases of the output potential are opposite or 180° apart on either side of the midpoint and the phase is arbitrarily termed $\phi1$ when the slider 36 is nearer terminal 38 and is termed $\phi2$ when the slider is nearer terminal 39. As the slider is moved from terminal 38 to the grounded point 37' $e_2$ the potential of the slider 36, diminishes to zero. When the slider is moved downward through the midposition 37' the phase of $e_2$ changes from $\phi1$ to $\phi2$, and as the slider is moved toward terminal 39 $e_2$ increases. Thus, when the shaft angle $\theta_2$ is positive, $e_2$ has phase $\phi1$, and when $\theta_2$ is negative, $e_2$ has phase $\phi2$.

The potential between any two of the conductors 16, 17 and 18, such as between conductors 16 and 18, varies in accordance with the shaft angle $\theta_1$ from maximum to zero and back again. The phase, being derived from the supply terminals 13, must be either equal thereto or 180° therefrom depending on the polarity of the connections and the position of shaft 14. Following the previously stated nomenclature, the phase of $e_1$, which is the potential between conductor 18 and the grounded conductor 16, is either $\phi1$ or $\phi2$.

By shifting the rotors of the synchros relative to their stators and by other adjustments the nominal zero positions of shafts 14 and 22 are brought nto coincidence, with positive and negative values of $\theta_1$ corresponding to positive and negative values of $\theta_2$, respectively. Also by selection and adjustment the phase of potential $e_1$ is made to be $\phi2$ when $\theta_1$ is positive and is made to be $\phi1$ when $\theta_1$ is negative.

It follows that when the circuit is thus arranged, and when the synchro system is operated in a normal manner so that $\theta_2=\theta_1$, then when $\theta_1$ is positive $\theta_2$ is also positive and $e_1$ has phase $\phi2$ while $e_2$ has phase $\phi1$. When $\theta_1$ is negative $\theta_2$ is also negative and $e_1$ has phase $\phi1$ while $e_2$ has phase $\phi2$. That is, $e_1$ and $e_2$ are always opposite in phase. By operation of the synchro system in a normal manner it is intended to mean operation so that the potentiometer slider 36 does not encounter either stop, so that its excursions are unhindered by the stops and the clutch 32 does not slip. The output angle $\theta_2$ then is substantially equal to the input angle $\theta_1$ for all values within the range of the potentiometer 33 and the above described condition of phase opposition of potentials $e_1$ and $e_2$ holds.

The remainder of the circuit of Fig. 1 about to be described has as its function the carrying out of the purposes of the invention, and prevents immobilization of the potentiometer arm against one of its stops during continuous rotation of the input shaft 14 in one direction, except in the 40° dead space when the output shaft 22 is endeavoring to move the potentiometer slider from terminal 38 to terminal 39, or vice versa, by the shorter path.

The conductor 48 is coupled through capacitor 49 and resistor 51 to the suppressor grid 52 of a pentode coincidence or comparator tube 53. The potentiometer slider 36 is connected through conductor 54 and capacitor 56 to the control grid 57 of the same pentode 53. Conductor 54 also constitutes the output potential conductor. The anode 58 is energized from positive terminal 59 through the coil 61 of an electromagnetic relay having contact arm 62 and normally open contact 63. The coil is shunted by an integrating or smoothing capacitor 64. A second electromagnetic relay coil 66 is energized in series with contacts 62/63 from a source of power, preferably direct current, represented by terminals 67, and is provided with two contact arms 24 and 68. The normally open contact 69 associated with arm 24 is connected to conductor 54.

The potentiometer mechanical limit stops 41 and 42 are provided with switches, each being single pole single throw and normally open. These switches are so arranged that when the arm 36' encounters either stop it closes the stop switch, shunting the two conductors 71 and 72 connected to the two switches in parallel. These conductors are connected in series with the relay coil 66, and are shunted by the relay arm 68 and normally open contact 73.

The operation of the servomechanism is so designed that when the error signal applied to servoamplifier 27 from the control transformer field 21 has the phase $\phi1$, the motor 28 operates in the direction to rotate the shaft 22 and potentiometer 33 clockwise. Conversely, when potential of phase $\phi2$, is applied to the servoamplifier the shaft and potentiometer are rotated counterclockwise. In normal operation when $\theta_2$ follows $\theta_1$ closely, clockwise rotation of $\theta_1$ causes the phase of the error signal to be $\phi1$, while counterclockwise rotation of $\theta_1$ causes the phase of the error signal to be $\phi2$. However, if the lag of $\theta_2$ behind $\theta_1$ becomes more than 180°, the error phase reverses.

If the input signal $\theta_1$ consists of a continuously increasing or decreasing angular position, thus rotating the potentiometer arm to a limit stop, the slip clutch 32 will slip immediately thereafter as motor 28 continues to run. Let it be supposed that the direction of rotation of $\theta_1$ through zero is clockwise. Then the brush 36 will stop when approaching terminal 39 as its arm 36' encounters limit stop 42. The limit stop switch 42 closes. Potential $e_2$ of brush 36 has phase $\phi2$. Potential $e_1$ at this instant has phase $\phi1$.

The grids 52 and 57 of coincidence pentode 53 are statically biased by negative potentials applied at terminals 77 and 78 through large resistances 75 and 80. These biases are overridden by alternating potentials $e_1$ and $e_2$ applied through large capacitances 49 and 56. The pentode 53 has the characteristic that when either grid, 57 or 52, is more negative than its cutoff potential, no anode current flows. The circuit is so arranged that when the potential $e_1$ or $e_2$ is positive, the corresponding grid is raised above its cutoff potential and when the potential is negative the grid is depressed below its cutoff potential. It follows that if $e_1$ and $e_2$ have opposed phases one of them is negative at all times and the pentode anode current cannot flow at any time. It also follows that if the potentials $e_1$ and $e_2$ be in phase, then both grids 52 and 57 are positive during one-half of each alternating current cycle and anode current will flow.

Let it be supposed that in the described action, as the input shaft 14 rotates clockwise it continues rotating after the potentiometer arm 36' has encountered its limit stop and has stopped moving. As $\theta_1$ increases, when $\theta_1=-180°$ its annular displacement is such that the phase of $e_1$ changes to $\phi2$. The phase of $e_1$ and $e_2$ are now alike, so that pentode anode current flows. The pentode current then operates relay coil 61, closing contacts 62/63. Since the limit stop 42 is closed, relay coil 66 operates, operating contact arm 68 to lock itself closed. Arm 24 is also operated, applying potential $e_2$ having the phase $\phi2$ to servo amplifier 27, reversing the direction of rotation of motor 28 and running the potentiometer rapidly counterclockwise toward stop 41. When, during this operation, arm 36' leaves stop 42, the stop switch 42 opens, but relay 66 does not open because it is locked by contacts 68/73. When, however, arm 36 passes its zero angle position 37', the phase of $e_2$ becomes $\phi1$, and as the phase of $e_1$ is now $\phi2$, tube 53 becomes non-conductive and relay 61 opens, releasing relay 66 and reconnecting the servo amplifier 27 for operation from the control transformer 19. However, since the shaft 22 has been rotated to the $\theta_2=0$ position while the shaft 14 has rotated clockwise past the $\theta_1=\pm180°$ position, the lag of $\theta_2$ behind $\theta_1$ has effectively become greater than 180°, so that the phase of the error signal applied through conductor 20 to servo amplifier 27 has reversed to $\phi2$. The counterclockwise rotation of the motor 28 is therefore continued in obedience to the error signal, rotating the potentiometer arm counterclockwise until it strikes the stop 41 and stops. The arm is thereafter moved from this stop in accordance with normal operation if and when shaft 22 attains an angle of +160° and passes into the sector of normal operation.

Operation of the device when the input shaft rotates continuously counterclockwise is similar to the operation on clockwise rotation just described.

A modification of the invention which does not employ electronic tubes is illustrated in Fig. 2. This circuit is more positive than the first described because the potential $e_2$ is increased in magnitude. The input shaft 14 positions synchro transformer 11 and its angular position $\theta_1$ is transmitted through conductors 16, 17 and 18 to the control transformer 19. A servomechanism including amplifier 27, motor 28, gear 31 and slip clutch 32 positions shaft 22 to angular position $\theta_2$ which in normal operation is closely similar to that of the input shaft 14. The control transformer shaft 22 operates, through step-up gear 34 and shaft 22', the 10-turn potentiometer 33 having output conductor 81. The midpoint 37' of the resistance element 37 is grounded, and the shaft position when slider 36 is at midpoint 37' is termed 0°. The terminals 38 and 39 of potentiometer 33 are energized by alternating current from terminals 13. Alternatively, in this embodiment the potentiometer 33 may be energized by direct current or other supply.

Two limit stops 82 and 83 are associated with potentiometer 33 to limit the travel of its arm, the electrical function of which is indicated by slider 36 and the mechanical function by arm 36'. The arm 36' strikes stops 82 and 83 at points corresponding to shaft angles approaching ±180°, for example, at +160° and −160° for stops 82 and 83 respectively. Each stop contains an electrical switch having two contact arms and two normally open contacts. The contact arms 82A and 82B are associated with stop 82 as is indicated by the dashed line 82', and contact arms 83A and 83B are associated with stop 83, as is indicated by the dashed line 83'. Stop contacts are closed only while the arm 36' is pressed against the respective stop.

A cam switch is also associated with potentiometer 33 to open and close contacts when the potentiometer and its shaft pass through 0°. The cam switch comprises cam 84 secured to shaft 22, cam follower 86, switch contact arm 87 and front and back contacts 88 and 89.

Conductor 18 is connected through conductor 91, stop contacts 82A and 83A in parallel, and a crystal diode 92 to terminal 93 of the coil 94 of an electromagnetic relay. The diode 92 is poled to have low resistance for current passing toward the relay terminal 93. Conductor 16 is grounded and connected through crystal diode 96 to terminal 97 of coil 94, resistance being low for current flowing toward terminal 97. An integrating condenser 94' is connected between terminals 93 and 97.

A transformer 98 is connected for energization from power terminals 13. Its secondary winding terminals are connected to cam switch contacts 88 and 89, and its midpoint 99 is connected to the grounded synchro conductor 16. The cam switch arm 87 is connected through conductor 101 and resistor 102 to terminal 97. The normally open contacts 103 of relay 94 are connected to a direct-current source represented by terminals 104 and to the coil 106 of a second electromagnetic relay having three contact arms 24, 107 and 108. The coil circuit is completed through limit switches 82B and 83B in parallel with each other and with relay locking contacts consisting of arm 108 and front contact 109. Relay contact arm 107 and its front contact 111 are connected in parallel with limit switches 82A and 83A. Contact arm 24 normally engages contact 23, completing the input circuit between control transformer 19 and servo amplifier 27. When arm 24 is operated to engage contact 112 it connects cam switch arm 87 to the input conductor 26 of servo amplifier 27.

In the operation of the circuit of Fig. 2, the change of phase of potential $e_1$ between conductor 18 and ground as the angle $\theta_1$ of input shaft 14 varies is as described in connection with Fig. 1, $e_1$ having the phase $\phi 1$ when $\theta_1$ is negative, and having phase $\phi 2$ when $\theta_1$ is positive. In normal operation, when $\theta_2 = \theta_1$ and the potentiometer slider 36' is free from engagement with its stops, the voltage $e_2$ at cam contact arm 87 has the phase $\phi 2$ when $\theta_2$ is positive and arm 87 is engaged with contact 88. When $\theta_2$ approaches zero the cam riser 84' forces follower 86 to move out of contact with contact 88, resulting in a zero potential for $e_2$ while $\theta_2$ is near zero. As cam 84 continues moving clockwise, contact arm 87 is forced into contact with contact 89, causing $e_2$ to reverse its phase and have phase $\phi 1$. Thus in normal operation $e_1$ and $e_2$ are never opposed in phase and are always alike except during the contact dead space, when $e_2$ is zero.

If it be assumed that the circuit be completed from conductor 91, Fig. 2, to diode 92, then during the negative half cycles of $e_1$ and $e_2$, $e_1$, being negative, cannot draw current through coil 94, Fig. 2, because of the high reverse resistance of diode 92. $e_2$, being negative, draws current from ground through diode 96 and resistor 102. During the positive half cycles $e_1$ causes diode 92 to conduct but is opposed by $e_2$ so that both terminals 93 and 97 of coil 94 are positive at the same time and therefore, when $e_1$ and $e_2$ are approximately equal in potential, or $e_2$ is greater, substantially no current flows in coil 94. During contact dead space the $e_2$ circuit is open and therefore $e_1$, even when positive, finds that the circuit through coil 94 is opposed by diode 96 and is incomplete at cam switch 87.

Let it be supposed that shaft 14 turns clockwise without limit so that $\theta_1$ passes from positive angles through zero to negative angles, $\theta_2$ likewise decreasing. When cam 84 passes clockwise through the position $\theta_2 = 0$ it operates switch 87 to contact 89, to place potential of phase $\phi 1$ on coil terminal 97. Arm 36' stops at stop 83, operating the stop switch, and closing contacts 83A and 83B and slip clutch 32 slips. Let it be supposed that during this movement the phase of the error signal applied from control transformer 19 to the servo amplifier 27 is $\phi 2$, causing the clockwise rotation of shaft 22. When, as $\theta_1$ continues to decrease it passes from −180° to +180°, the phase of $e_1$ becomes $\phi 2$ and opposed to that of $e_2$. This operates relay 94 in the following manner: When $e_1$ is in a positive half cycle, diode 92 becomes conducting. $e_2$ being of opposed phase and at this time negative, diode 96 becomes conductive, grounding terminal 97, and $e_1$ causes current to flow through coil 94 to ground. During the negative half cycle of $e_1$ both diodes become non-conductive and no current flows. The condenser 94' averages the current flow so that relay 94 remains operated.

When relay 94 operates its contacts 103 operate relay 106 which locks through contacts 108/109. Contact arm 24 makes contact with contact 112, applying potential having phase $\phi 1$ to the servo amplifier 27 and reversing the direction of rotation of motor 28. The motor moves the potentiometer arm counterclockwise away from stop 83 until cam 84 breaks contact 89, when relays 94 and 106 open. The servo amplifier 27 now returns to operation on the control transformer error signal which now has the phase $\phi 1$, causing counterclockwise rotation of shaft 22 to stop at 82, ready for normal operation in consonance with shaft 14 if the latter should continue its clockwise rotation to and beyond +160°.

Similar operation occurs in continuous counterclockwise operation of shaft 14, preventing permanent freezing of the potentiometer arm against stop 82.

In normal operation between stops, the stop switches being open and relay 106 unoperated, conductor 91 is open and current drain from conductors 16, 17 and 18 is prevented. This preserves the accuracy of synchro transmission of the angle $\theta_1$.

What is claimed is:

1. A device of the kind described comprising, a synchro circuit provided with input and output shafts and carrying a transmitted alternating electrical signal, transducer means operating between two limit stops to convert said output shaft indications to electrical indications and emitting a potential having phase sense reversing between the stops, comparator means for operating a switch in accordance with the coincidence of sense of said alternating electrical signal and said potential, and means operated by said switch when said transducer means is at a limit stop to position the transducer means to the limit stop more nearly indicating the position of said input shaft.

2. A device of the kind described comprising, a synchro signal transmission system including an input shaft and an output shaft interconnected by transmission circuit means carrying an alternating current signal having a phase sense dependent on the angular position of said input shaft, a potentiometer rotated by said output shaft, said potentiometer being energized at its end terminals by an alternating current source and having a grounded center tap whereby the phase sense of the potential at its slider is determined by the position thereof, a pair of limit switches positioned to be engaged by said slider at each limit of its movement, coincidence tube means having said alternating current signal and the potential of said slider impressed thereon and producing an anode current when said alternating current signal and said slider potential have like phase sense, a relay connected in the anode circuit of said coincidence tube means and operated by the anode current thereof, a switching relay, circuit means operating said switching relay by the conjoint operation of said anode circuit relay and one or the other of said limit switches, and means operated by said switching relay to reverse the direction of rotation of said potentiometer.

3. A device of the kind described comprising, a first synchro, an input shaft connected thereto, a second synchro, an output shaft connected thereto, a circuit interconnecting said first and second synchros carrying an alternating current signal the phase sense of which is dependent on the angular position of said input shaft, a servo mechanism circuit interconnecting said second synchro and said output shaft, a potentiometer rotated by said output shaft, said potentiometer being energized at its end terminals by an alternating current source and having a grounded center tap whereby the phase sense of the potential at its slider is determined by the position thereof, a pair of limit switches positioned to be engaged by said slider at each limit of its movement, an electronic tube, a first grid thereof having said alternating current signal impressed thereon, a second grid thereof having the potential of said slider impressed thereon, a first relay connected in the anode circuit of said electronic tube, a second relay, circuit means operating said second relay by the conjoint operation of said first relay and one or the other of said pair of limit switches, and means operated by said second relay for reversing the operation of said servo mechanism.

4. A device in accordance with claim 3 in which said servo mechanism is connected to said output shaft through a slip clutch.

5. A device of the kind described comprising, a first synchro, an input shaft connected thereto, a second synchro, an output shaft connected thereto, a circuit interconnecting said first and second synchros carrying an alternating current signal the phase sense of which is dependent on the angular position of said input shaft, a servo mechanism circuit interconnecting said second synchro and said output shaft, means connected to said output shaft for producing a correction signal having one phase sense or the opposite phase sense depending on the orientation of said output shaft relative to a selected medial orientation, means for limiting the angular displacement of said output shaft including a pair of limit switches positioned to be engaged and operated at each limit of angular displacement of said output shaft, a first relay, circuit means operating said first relay by said alternating current signal and said correction signal on the occurrence of a selected relative phase sense therebetween, a second relay, circuit means operating said second relay by the conjoint operation of said first relay and one or the other of said pair of limit switches, and means operated by said second relay for disconnecting the input of said servo mechanism from said second synchro and for applying said correction signal to said servo mechanism.

6. A device of the kind described comprising, a first synchro, an input shaft connected thereto, a second synchro, an output shaft connected thereto, an alternating current circuit interconnecting said first and second synchros, an amplifier connected to the motor of said second synchro, a motor operated by said amplifier output, a slip clutch interconnecting said motor and said output shaft, a potentiometer rotated by said output shaft, said potentiometer being connected across an alternating current source and having a grounded center tap, a pair of limit switches positioned to be engaged when the slider of the potentiometer reaches each limit of its movement, an electronic tube including a pair of control grids, one of said control grids having a signal derived from said alternating current circuit impressed thereon and the other of said control grids having the potential at the slider of said potentiometer impressed thereon, a first relay connected in the anode circuit of said electronic tube, a second relay, circuit means operating said second relay by the conjoint operation of said first relay and one or the other of said pair of limit switches, and means operated by said second relay for disconnecting said second synchro from said amplifier and connecting said potentiometer slider thereto.

7. A device of the kind described comprising, a first synchro, an input shaft connected thereto, a second synchro, an output shaft connected thereto, an alternating current circuit interconnecting said first and second synchros, an amplifier having its input connected to the rotor of said second synchro and a motor connected to its output, a slip clutch interconnecting said motor and said output shaft, a transducer having a limited degree of rotation connected to said output shaft, a pair of limit switches positioned to be engaged when said transducer reaches each limit of its degree of rotation, means including a cam switch and an alternating current source producing a correction signal whose phase is reversed when said transducer passes through a position midway of its limits of rotation, circuit means including a first relay operated by opposed phase relation between a signal derived from said alternating current circuit and said correction signal, circuit means operating said second relay by the conjoint operation of said first relay and one or the other of said pair of limit switches, and means operated by said second relay for disconnecting said second synchro from the input of said amplifier and for applying said correction signal thereto.

8. A device of the kind described comprising, a synchro signal transmission system including an input shaft and an output shaft interconnected by transmission circuit means producing an alternating current signal of one phase or the opposite phase depending on the angular position of said input shaft relative to a selected angular position thereof, means connected to said output shaft for producing an electrical signal of one phase or the opposite phase depending on the angular position of said output shaft relative to a selected angular position thereof, a pair of limit stops each including a limit switch for limiting the angular movement of said output shaft, means for comparing the phases of said alternating current signal and said electrical signal and operated by the occurrence of selected mutually relative signal phases thereof to produce an error signal, and means including a respective one of said limit switches and actuated by said error signal for driving said output shaft towards the limit stop which includes the other of said limit switches.

9. A device of the kind described comprising, a synchro signal transmission system including an input shaft and an output shaft interconnected by transmission circuit means producing an alternating current signal whose phase sense reverses as said input shaft passes through a selected angular position, means connected to said output shaft for producing an electrical signal whose phase sense reverses as said output shaft passes through a selected angular position, a pair of limit stops each including a limit switch for limiting the angular movement of said output shaft, means for comparing the phase sense of said alternating current signal and said electrical signal and operated by the simultaneous occurrence of like phase sense thereof to produce an error signal, and means including a respective one of said limit switches and actuated by said error signal for driving said output shaft towards the limit stop which includes the other of said limit switch.

10. A device of the kind described comprising, a synchro signal transmission system including an input shaft and an output shaft interconnected by transmission circuit means producing an alternating current signal whose phase sense reverses as said input shaft passes through a selected angular position, means connected to said output shaft for producing an electrical signal whose phase sense reverses as said output shaft passes through a selected angular position, a pair of limit stops each including a limit switch for limiting the angular movement of said output shaft, means for comparing the phase sense of said alternating current signal and said electrical signal and operated by the simultaneous occurrence of opposite phase sense thereof to produce an error signal, and means including a respective one of said limit switches and actuated by said error signal for driving said output shaft towards the limit stop which includes the other of said limit switches.

No references cited.